March 7, 1933.  A. J. SORENSEN  1,900,408
ELECTRIC CONTROL SYSTEM
Filed May 11, 1931   4 Sheets-Sheet 1

INVENTOR:
A. J. Sorensen,
BY
His ATTORNEY.

March 7, 1933.  A. J. SORENSEN  1,900,408
ELECTRIC CONTROL SYSTEM
Filed May 11, 1931  4 Sheets-Sheet 3

INVENTOR:
A. J. Sorensen,
BY
his ATTORNEY.

March 7, 1933. A. J. SORENSEN 1,900,408
ELECTRIC CONTROL SYSTEM
Filed May 11, 1931 4 Sheets-Sheet 4

INVENTOR:
A. J. Sorensen,
BY
His ATTORNEY.

Patented Mar. 7, 1933

1,900,408

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRIC CONTROL SYSTEM

Application filed May 11, 1931. Serial No. 536,390.

My invention relates to electric control systems, and particularly to electric control systems adapted to control the brakes of railway trains.

I will describe certain forms of apparatus embodying my invention, and will then point out the novel features thereof in claims.

Figure 1:
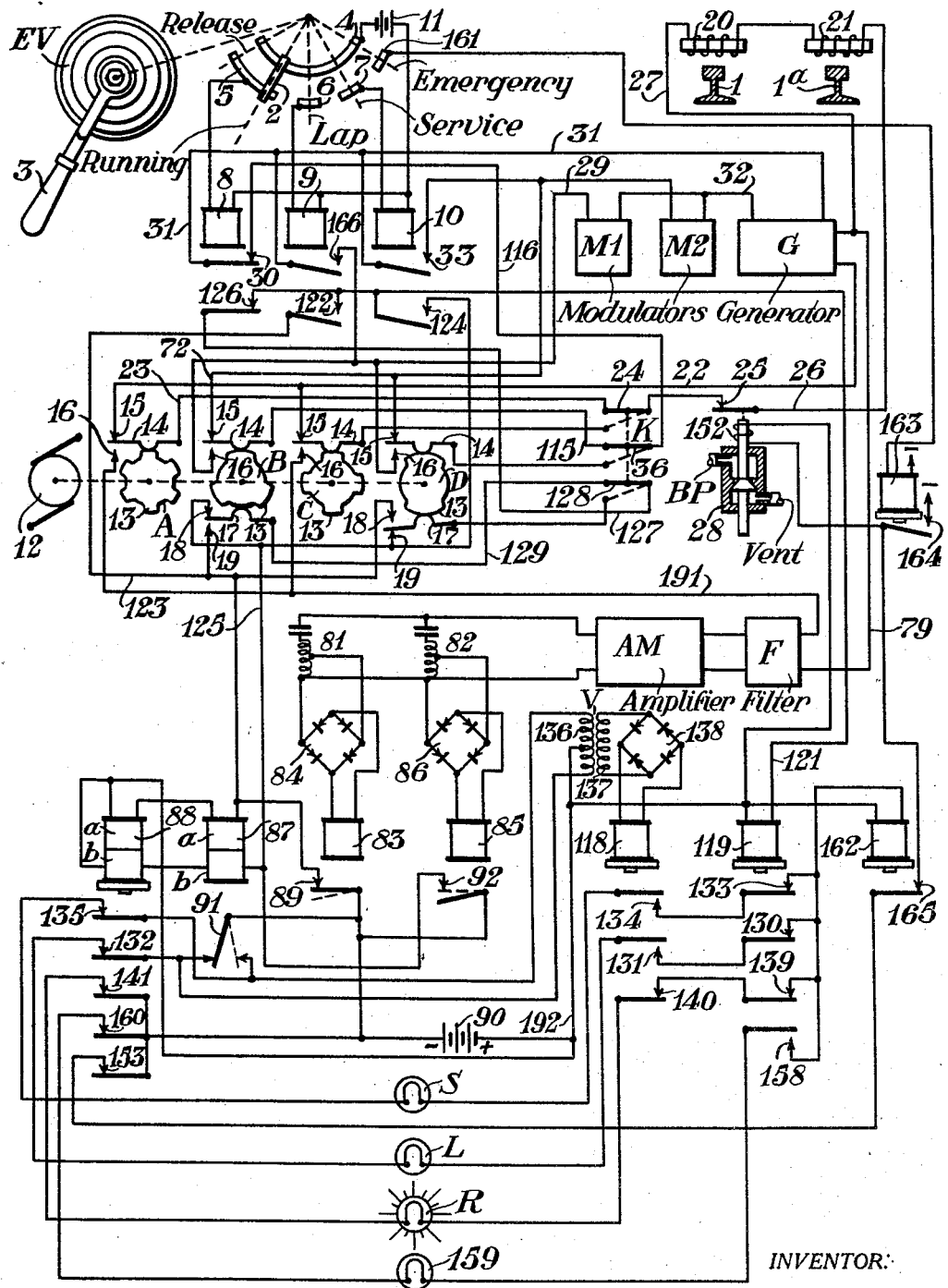
Figure 2:
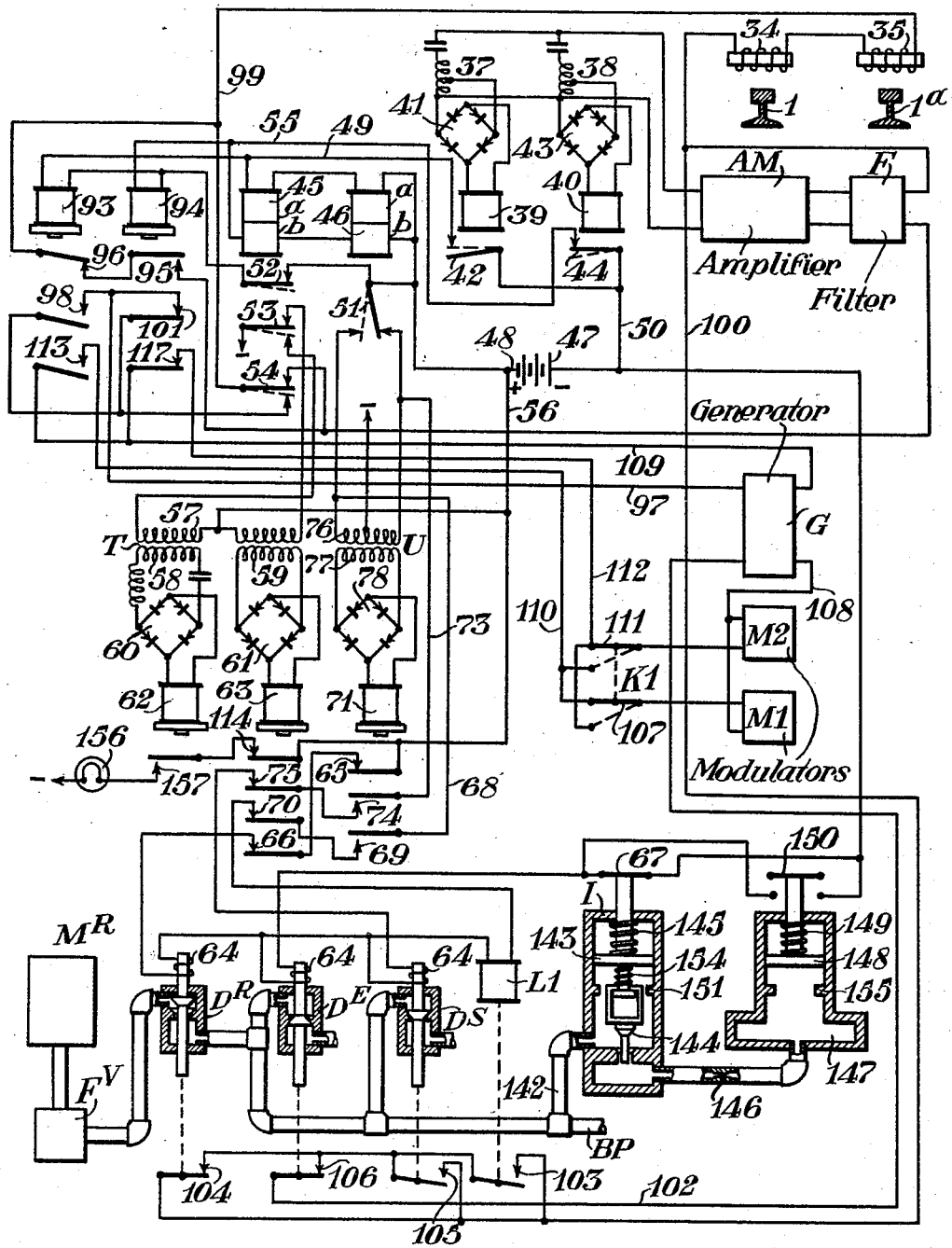
Figure 3:
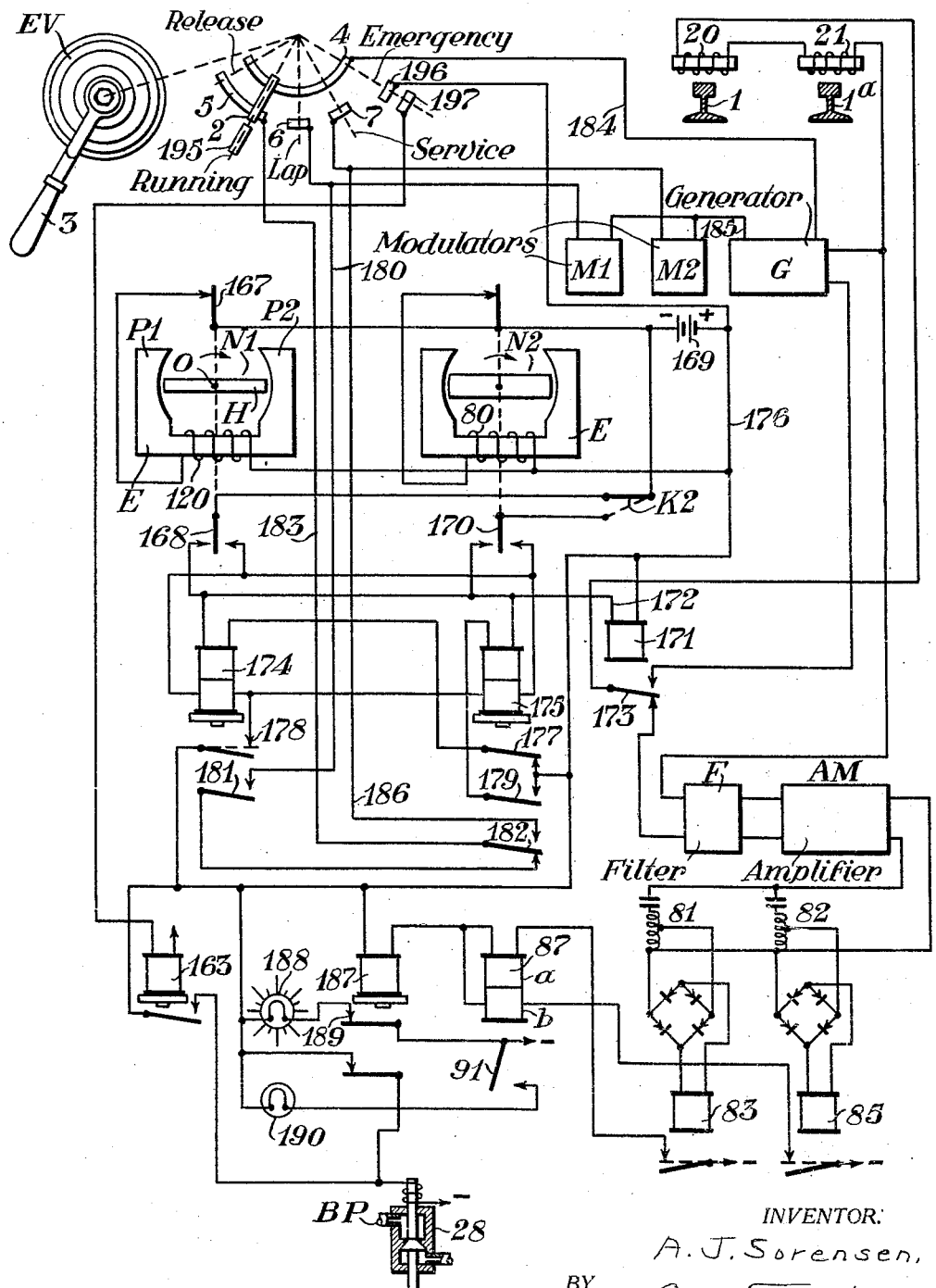
Figure 4:
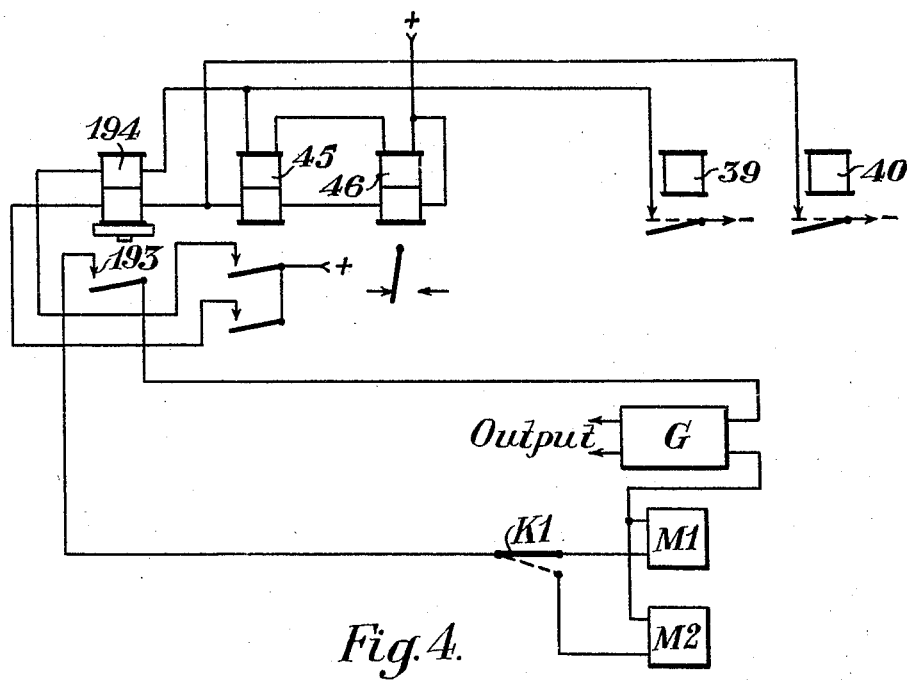

In the accompanying drawings, Figs. 1 and 2 constitute a diagrammatic view of one form of apparatus embodying my invention for a brake control system of a railway train. The apparatus of Fig. 1 is that located at the control point which, in this instance, is on the locomotive, with the operation of the apparatus governed by the condition of the usual engineer's brake valve. The apparatus of Fig. 2 is that installed at another point on the train to control an auxiliary brake controlling mechanism adapted to reproduce certain functions of the engineer's brake valve on the locomotive. That the operator on the locomotive may know the condition of the auxiliary brake controlling mechanism, the apparatus of Fig. 2 is arranged to transmit a return influence to the apparatus of Fig. 1. Furthermore, in this system, messages may be exchanged between the two locations. Fig. 3 is a diagrammatic view of a second form of apparatus that may be used at the control point. Fig. 4 is a modification to be applied to the apparatus of Fig. 2 when that apparatus is to be used in connection with the apparatus of Fig. 3.

While the apparatus of Fig. 2 may be located at any point on the train, it will be referred to in the following description as being installed in the caboose of a freight train. Although I am here disclosing a specific application of my invention, it will be understood that I do not wish to limit myself to train brake control systems but that my invention is equally useful for other control systems where an apparatus located at one location is to be controlled from a remote point.

In the several accompanying drawings, like reference characters designate like parts.

Referring to Fig. 1, the reference character EV designates the usual engineer's brake valve of the standard type capable of establishing the "release", "running", "lap", "service" and "emergency" conditions of the brake pipe pressure. As shown schematically, the contactor 2 is connected to and operated by the handle 3 of the valve EV. The contactor 2 is adapted to engage the arcuate member 4 in all positions of the handle 3 and to engage the contact 5 in the release and running positions, and to engage the contacts 6, 7 and 161 in the lap, service and emergency positions, respectively. Associated with the control handle 3 are three relays 8, 9 and 10. Current for energizing these relays is supplied by a battery 11 over simple circuits that can be easily traced and it seems sufficient to point out that with the handle 3 in either the release or running position so that contactor 2 engages contacts 4 and 5, the relay 8 is energized. When the handle 3 is in the lap position, then relay 9 is energized, and when it occupies the service position, relay 10 is energized.

The locomotive is provided with four cams A, B, C and D of suitable insulating material and all mounted on the same shaft, as indicated by a dotted line. These cams are driven preferably through gears by a constant speed motor 12 supplied with current from any convenient source such as a headlight generator not shown. Each cam is arranged with raised portions 13 uniformly spaced on the circumference, the cam A having six such raised portions, cam B three, cam C four, and cam D two. Each cam is adapted to engage an associated contact spring 14, raising this spring to engage a front contact 15 when its raised portion 13 engages the spring 14 and to permit spring 14 to engage a back contact 16 when the depression between two raised portions mates with the spring 14. The cams B and D each also engage a second spring 17 causing it to be operated between the two contacts 18 and 19 as the cams rotate.

As will be hereinafter pointed out, the springs 14 of the cams A and C serve to alternately connect the inductor coils 20 and 21 to the output and input circuits. The inductor coils 20 and 21 are mounted on the locomotive in inductive relation with the traffic rails 1 and 1ª, respectively. At the control point there is provided a generator G of carrier current of a frequency such, for example, as five thousand cycles per second. The output of the generator is modulated in the usual manner by the modulators M1 and M2 which may be generators of low frequency current of, say forty and fifty cycles per second, respectively. However, it will be understood that I am not limited to these specific frequencies but that they are given by way of illustration only. The generator G and the modulators M1 and M2 may be of one of many well known types, among them being the vacuum tube type. As the type of neither the generator G nor the modulators M1 and M2 form any part of my invention, they are indicated in the drawings by a rectangle only in order to simplify the drawings as much as possible.

Assuming the cams to momentarily occupy the positions shown in the figure, the generator G is connected to the inductor coils 20 and 21 by a circuit extending from one terminal of G along the wire 22, contact 15 and spring 14 of cam A, wire 23, contact 24 of a manually operated key K, contact 25 actuated by the moving part of a valve 28 to be described later, wire 26, coils 21 and 20 and wire 27 to the opposite terminal of the generator G. As the spring 14 disengages contact 15 between the raised portions 13 of the cam A, the above output circuit is alternately closed and opened six times for each complete revolution of the cam A. As shown in the figure, the arc of a raised portion 13 of cam A is made substantially equal to the arc of a depressed portion between two raised portions and as the cam is rotated at a uniform speed, it follows that the duration of an outgoing impulse and the duration between two such impulses are substantially equal.

When the handle 3 is placed at the lap position so that the contactor 2 engages the contacts 4 and 6 to bring about the energization of relay 9, the supply of generator G is modulated by M1 over a circuit extending from one terminal of M1 along wire 29, contact 166 of relay 9, wire 31, generator G, and wire 32 to the opposite terminal of M1. Thus we see that each outgoing impulse of carrier current under the lap condition of the brake valve EV is modulated with the frequency of M1. In the event the handle 3 is placed at the service position and the relay 10 energized, the circuit for the modulator M2 is closed. This circuit can be traced from one terminal of M2 through the contact 33 of relay 10, wire 31, generator G, and wire 32 which is also connected to the opposite terminal of M2. Thus, it is to be seen that each impulse of carrier current supplied by generator G under the service condition of the valve EV is modulated by M2. In the event the handle 3 is at the running position, as shown in the figure, so that the relay 8 is energized, then when the cams occupy the positions shown, the output of generator G is modulated by M2 over a circuit extending from M2 along wire 72, front contact 15 of the cam B, spring 14, wire 115, contact 36 of the key K, wire 116, contact 30 of relay 8, wire 31, generator G, and wire 32 back to the opposite terminal of M2. As the cams advance to a point where the spring 14 associated with the cam B mates with a depression so that it engages—its back contact 16, the modulator M1 is made active by a circuit extending from M1 along wire 29, back contact 16 of the cam B, spring 14, and then as above traced. The raised portions 13 of the cam B are so spaced on its circumference that they register with every other one of the raised portions 13 of the cam A and those of cam B are of a length substantially equal to the arc of a raised portion plus a depression of cam A. As pointed out above, when the cams A and B occupy the position shown in the figure under the running condition of the valve EV, the output of G is modulated by M2. When the cams turn to such an angle that the next raised portion of A is in engagement with its associated spring 14, the cam B will have moved to such a position that its associated spring 14 will mate with a depression and engage its back contact 16 so that the output of G is then modulated by M1. It follows then that as cams A and B are rotated under the running condition of EV, every other one of the impulses supplied by G are modulated by M2 and every other one by M1, that is, the modulators M2 and M1 are made effective in a cyclic order.

To sum up thus far, under the release or running condition of the brake valve EV, the traffic rails 1 and 1ª are supplied with periodic impulses of carrier current with the successive impulses modulated by M2 and M1 in a cyclic order. Under the lap condition of the brake valve EV, each periodic impulse of carrier current supplied to the rails is modulated with the frequency of M1. Under the service condition of the brake valve, the rails are likewise supplied at recurrent intervals with impulses of carrier current each modulated with the frequency of M2. Under the emergency condition of the brake valve, none of the relays 8, 9 or 10 are energized and the impulses supplied to the rails are non-modulated.

Referring to Fig. 2, the apparatus installed in the caboose includes inductor coils 34 and 35 located in inductive relation with the traffic rails 1 and 1ª similar to the coils 20 and 21 at the locomotive. These coils 34 and 35 are, at times, connected to the input circuit of a filter F through which current picked up from the traffic rails is applied to an amplifier AM. This filter F and amplifier AM may be one of many well known types, and as their specific type forms no part of my invention, they are indicated in the figure by a symbol only. The output of amplifier AM is applied to a selective network including two sharply tuned circuits 37 and 38 which operate the primary relays 39 and 40, respectively. These selective circuits 37 and 38 are respectively tuned to resonance at the modulating frequencies of M1 and M2 of Fig. 1. Thus with the carrier current modulated with the frequency of M1, picked up by the coils 34 and 35 and applied to the amplifier AM, the circuit 37 supplies current to the relay 39 through the full-wave rectifier 41 to energize that relay. When this modulated current is periodically interrupted then the relay 39 operates its armature 42 once for each impulse of the modulated current. Likewise, if the carrier current is modulated with the frequency of M2, the circuit 38 is responsive to apply current to the relay 40 through the full-wave rectifier 43. With this modulated current periodically interrupted, the relay 40 operates its armature 44 in step with the impulses. It follows then that whichever modulating frequency is applied to the carrier current impulses supplied to the transmitting circuit by the apparatus of Fig. 1, the corresponding primary relay of Fig. 2 is operated once for each periodic impulse of the carrier current.

Associated with the primary relays 39 and 40 are two relays 45 and 46, the relay 46 being a polarized relay. Each relay 45 and 46 is provided with two energizing windings $a$ and $b$. With the relay 39 energized to close the front contact of its armature 42, a circuit is completed from a battery 47 along wire 48, through the $a$ windings of the relays 46 and 45 in series, wire 49, front contact of armature 42 of relay 39, and the common return wire 50 to the negative terminal of the battery 47. The polarity of the magnetic field created by the energizing of the winding $a$ of the relay 46 is such as to cause its polarized armature 51 to be positioned in the left-hand position, that is, the position opposite that shown in the figure. The energizing of the winding $a$ of relay 45 causes it to lift its contacts 52, 53 and 54 into engagement with their front contacts. When the relay 40 is operated to close the front contact of its armature 44, then a circuit is completed from the battery 47 through the $b$ windings of relays 46 and 45 in series, wire 55, front contact of the armature 44 of relay 40 and to battery by the common return wire 50. The polarity of the magnetic field created by the energizing of the winding $b$ of relay 46 causes its polarized armature 51 to be moved to the right-hand position, that is, the position shown in the figure, while the energizing of the winding $b$ of relay 45 lifts its contacts the same as the energizing of its winding $a$. The polarized relay 46 is adjusted so that when it becomes deenergized, its armature remains in the position to which it was last moved. From what has just been said, it is seen that with the primary relay 39 operated in response to periodic impulses of modulated carrier current, the relay 45 is also operated in step with the impulses while the polarized armature 51 continuously remains in the left-hand position. With the primary relay 40 operated, the relay 45 is also operated and the polarized armature 51 is continuously held in the right-hand position.

When the relay 45 is deenergized, current is supplied from positive battery 47 along the wires 48 and 56, the left-hand half of the primary 57 of a transformer T, back contact 53 of the relay 45 and to the negative terminal of the battery 47. When the relay 45 is energized so as to close its front contact 53 then current is supplied to the right-hand half of the primary 57. It will therefore be seen that when relay 45 is operated in response to the operation of one of the primary relays, an alternating current will be induced in the secondaries 58 and 59 of the transformer T. The frequency of this alternating current will depend upon the rate at which the periodic impulses occur to operate the primary relay. The currents induced in the secondaries 58 and 59 are suplied to the full-wave rectifiers 60 and 61, respectively, causing unidirectional currents to flow in the windings of the relays 62 and 63. respectively, to energize these relays. The circuit fed by the secondary 59 is non-tuned and thus the relay 63 will be energized regardless of the frequency of the current induced in the secondary 59. The circuit fed by the secondary 58, however, is tuned by a condenser-reactor combination to resonance at a frequency equal to that of the current induced in the secondary 58 when a primary relay is operated by periodic impulses of a rate equal to that produced by the cam A. It follows then that relay 63 will always be energized when a primary relay is operated regardless of the rate at which the operating impulses occur, while the relay 62 will be energized only when the periodic occurrence of the incoming impulses correspond to the rate produced by the cam A.

The caboose is equipped with a main reservoir $M^R$, a feed valve $F^V$, electropneumatic valves $D^R$, $D^E$ and $D^S$ and a relay L1. The caboose, of course, will also be equipped with a compressor and all other apparatus necessary to insure ample supply of air pressure in the main reservoir $M^R$. The valves $D^R$ and $D^S$ are each biased to a closed position and each is opened when its associated magnet 64 is energized. The valve $D^E$ is biased to an open position and is held closed when its magnet 64 is energized. When the valve $D^R$ is opened then the brake pipe BP is connected to the feed valve $F^V$ and the auxiliary brake controlling mechanism reproduces the running condition of the engineer's valve EV on the locomotive. With the valve $D^S$ opened, the brake pipe BP is connected to the atmosphere through a vent of such characteristics as to produce a reduction of the brake pipe pressure at substantially the service rate of the usual brake valve to effect the service application of the brakes. When the valve $D^E$ is open, that is, when its magnet 64 is deenergized, then the brake pipe is connected to the atmosphere through a vent of such characteristics as to produce the emergency rate of reduction of the brake pipe pressure and an emergency application of the brakes. When the valve $D^E$ is held closed and both valves $D^R$ and $D^S$ are closed, both the supply and exhaust of the brake pipe are blanked and the auxiliary mechanism reproduces the lap condition of the usual engineer's brake valve. In the form of the apparatus shown in Fig. 2, the emergency valve $D^E$ is the one normally retained energized to insure a "closed circuit" principle for the equipment. It will be understood, however, that any one of the other valves might be used in this way should it seem desirable to do so.

In describing the operation of the auxiliary brake mechanism of Fig. 2, I shall assume first that the handle 3 of Fig. 1 is placed at the running position so that the outgoing periodic impulses supplied to the traffic rails by the generator G of Fig. 1 are alternately modulated by M2 and M1 in cyclic order. Assuming that the first impulse is modulated by M2, then, when this impulse is picked up by the inductors 34 and 35 and applied to the amplifier AM, the primary relay 40 is operated causing the relay 45 to be operated also and the polarized armature 51 of relay 46 to seek its right-hand position. The operating of relay 45, in turn, causes an impulse to be induced in the secondaries 58 and 59. The next impulse is modulated by M1 to operate the relay 39 and, in turn, to again cause relay 45 to be operated while the polarized armature 51 of relay 46 is now shifted to its left-hand position. The operating of relay 45 again induces current in the secondaries 58 and 59.

The operation just described will be repeated in cyclic order as long as the modulation of the impulses by M2 and M1 occur in cyclic order. As the circuit for the secondary 59 is non-tuned, the relay 63 will be energized. As the periodic occurrence of the impulses is determined by the cam A, the frequency of the current induced in the secondary 58 is equal to that at which this secondary circuit is tuned and thus the relay 62 will also be energized. The continual shifting of the polarized armature 51 back and forth between its two positions causes current to flow from the battery 47 alternately in the two halves of the primary 76 of a transformer U as will be readily seen from an inspection of Fig. 2. These current impulses in the primary 76 induce an alternating current in the secondary 77 which, when applied to the relay 71 through the full-wave rectifier 78, energizes that relay. Thus under the normal running or release condition of the apparatus of Fig. 1, the periodic rate of the outgoing impulses is governed by the cam A while the successive impulses are alternately modulated by M1 and M2 by means of the cam B with a result that the three control relays 62, 63 and 71 of the caboose apparatus are all energized.

As the relays 63 and 71 pick up, current flows from the battery 47 along wires 48 and 56, front contact 65 of relay 71, front contact 66 of relay 63, magnet 64 of the valve $D^R$, magnet 64 of the valve $D^E$, a circuit controller 67 operated by the device I to be described later, and the common return wire 50 back to the battery 47. As the relays 62, 63 and 71 are each provided with slow-releasing characteristics, these relays will remain in their energized position as long as the periodic impulses picked up by the coils 34 and 35 are alternately modulated by M2 and M1 in cyclic order. It follows then that the running position of the handle 3 of Fig. 1 cause the auxiliary mechanism of Fig. 2 to establish the running condition of the brake pipe pressure at the caboose.

Let us next assume that the handle 3 is placed at the lap position so that the impulses of carrier current supplied to the traffic rails at the locomotive are each modulated by M1. When these impulses are picked up by the coils 34 and 35 at the caboose, the relay 39 is operated to operate, in turn, the relay 45, and to cause the polarized armature 51 to be continuously held in the left-hand position. The relays 62 and 63 will both be energized as the result of the operation of the relay 45, in the same manner as pointed out under the running condition, but the relay 71 will become deenergized due to the fact that the armature 51 remains continuously in the left-hand position and no current is induced in the secondary 77 of the transformer U. With this set up of the controlling relays 62, 63 and 71, current flows from the battery 47 along the wire 48, left-hand contact of armature 51, wire 68, back contact 69 of relay 71, front contact 70 of relay 63, winding of the relay L1, magnet 64 of the valve $D^E$, and then back to the negative terminal of the battery 47 through the controller 67 and return wire 50. The lap position of the brake valve EV thereby causes the auxiliary mechanism in the caboose to establish the lap condition of the brake pipe pressure and also energizes the relay L1. Next let us assume that the handle 3 is placed at the service position so that each impulse supplied by the apparatus of Fig. 1 is modulated with the frequency of M2. The picking up of such modulated impulses of carrier current at the caboose operates the primary relay 40. As relay 40 operates, the relay 45 is also operated and the polarized armature 51 of relay 46 is held continuously in the right-hand position. The operation of the relay 45 again causes the relays 62 and 63 to be energized while the relay 71 will still remain deenergized as the armature 51 is now held at its right-hand position. Current now flows from the battery 47 through the wire 48 to the right-hand contact of armature 51, wire 73, back contact 74 of the relay 71, front contact 75 of the relay 63, magnet 64 of the valve $D^S$ magnet 64 of the valve $D^E$ and then to the negative terminal of the battery 47 through the controller 67 and wire 50. Therefore, the service position of the handle 3 on the locomotive causes the auxiliary mechanism in the caboose to reproduce the service condition of the brake pipe pressure. When the brake valve handle 3 is placed at the emergency position, the outgoing impulses are nonmodulated and neither primary relay 39 nor 40 in the caboose is operated. When the relays 39 and 40 are not operated then the control relays 62, 63 and 71 all become deenergized and the magnet 64 of the valve DE is, in turn, deenergized, resulting in the auxiliary mechanism establishing the emergency condition of the brake pipe pressure.

To sum up the operation of the apparatus of Figs. 1 and 2 thus far, we find that each condition of the engineer's brake valve EV on the locomotive is reproced by the auxiliary brake controlling mechanism in the caboose with the exception that a running condition is established for either the release or running condition of the valve EV.

The apparatus of Figs. 1 and 2 provide a return indication from the caboose to the locomotive to inform the operator whether or not the brake condition he has set up on the locomotive is being duplicated in the caboose. To this end, a sending apparatus is included in Fig. 2 and a receiving apparatus included in Fig. 1. To insure that the return indication not only means that the control impulse sent out by the locomotive apparatus has been received at the caboose but that the proper valves have functioned, a contact is mounted on the movable part of each valve adapted to make on its front contact when the valve is energized and on its back contact when the valve is deenergized, and also, the relay LI is provided to operate a contact 103 when energized. Through these contacts, the output circuit of the caboose apparatus is controlled as will be shortly pointed out.

Looking now at Fig. 1 and recalling that as the cam A rotates the associated spring 14 engages the back contact 16 during the interval between two raised portions 13, we find that when the spring 14 engages its back contact 16, the inductor coils 20 and 21 are connected to an input circuit extending along wires 27 and 79, a filter F, wire 191, contact 16 of cam A, spring 14, wire 23, contacts 24 and 25, and wire 26 to the opposite terminal of the inductor coils. The energy of this input circuit is supplied through the filter F to an amplifier AM whose output is connected to a selective network including the two sharply tuned circuits 81 and 82. The filter F and amplifier AM of Fig. 1 are preferably similar to those of Fig. 2 and the tuned circuits 81 and 82 are similar to the circuits 37 and 38 in the caboose. Circuit 81 is responsive when the input circuit of Fig. 1 is energized by a carrier current modulated at the frequency of M1 to supply current to the relay 83 through the full-wave rectifier 84. The circuit 82 is responsive, when the carrier current energizing the input circuit is modulated at the frequency of M2, to supply current to the relay 85 through the rectifier 86 to energize that relay. With the carrier current periodically interrupted, then the relays 83 and 85 are operated in step with the periodic impulses in the same manner as the primary relays 39 and 40 of Fig. 2. Associated with the primary relays 83 and 85 are the polarized relay 87 and the neutral relay 88, respectively similar to the polarized relay 46 and neutral relay 45 of Fig. 2 except for the fact that relay 88 is provided with slow-releasing characteristics. When the relay 83 is operated to close the front contact of its armature 89, current flows from the positive terminal of a battery 90 through the $a$ windings of the relays 88 and 87 in series and front contact of armature 89 to the negative terminal of the battery 90 causing the relay 88 to lift its contacts and causing the polarized armature 91 of relay 98 to be moved to its left-hand position. When the relay 85 is operated to close the front contact of its armature 92, current flows from the positive terminal of the battery 90 through the $b$ windings of the relays 88 and 87 and the contact 92 to the negative terminal of the battery 90 causing relay 88 to be energized and the polarized armature 91 of relay 87 to seek its right-hand position.

The caboose is provided with a generator G adapted to supply carrier current and two modulators M1 and M2 preferably similar to the generator G and the modulators on the locomotive. It has been pointed out how the cam A on the locomotive alternately shifts the apparatus of Fig. 1 from the sending to the receiving condition with an approximately equal period for each function. The relays 93 and 94 of Fig. 2 together with the relay 45 change the equipment of Fig. 2 from receiving to sending condition and vice versa at the proper time. With the apparatus of Fig. 2 all deenergized, the inductor coils 34 and 35 are connected to the receiving circuit that includes the filter F through the back contacts 95 and 96 of the relays 94 and 93, respectively, as will be evident from an inspection of Fig. 2. The receipt of an impulse of carrier current modulated by either modulator M1 or M2 of Fig. 1 causes either the relay 39 or 40 to be operated energizing the relay 45. As relay 45 picks up, current is supplied from positive battery 47 along wire 48, front contact 52 of relay 45, winding of relay 93, and front contact of armature 42 of relay 39 to the negative terminal of battery 47 if relay 39 is the one that is operated, or through the winding of relay 94 and front contact of the armature 44 of relay 40 if relay 40 is the one that is operated. As the relay 45 picks up, the receiving circuit from the coils 34 and 35 is retained closed at its front contact 54 to insure that the receiving circuit is maintained complete as long as the incoming impulse lasts. At the end of the incoming impulse, that is, when cam A rotates to a point where its spring 14 is disconnected from the contact 15, the energized primary relay 39 or 40 becomes deenergized and the relay 45 in the caboose immediately drops to disconnect the coils 34 and 35 from the filter F. As relays 93 and 94 are each provided with slow-releasing characteristics, whichever relay happened to be energized during the incoming impulse, remains up during its release period after the relay 45 drops at the end of the impulse. Assuming that it was the relay 93 that was energized, then during the release period of 93, the coils 34 and 35 are connected to the output circuit of the generator G by a circuit extending from one terminal of G along wire 97, front contact 98 of relay 93, back contact 54 of relay 45, wire 99, coils 35 and 34, wire 100, contact 103, 104 or 105 whichever one happens to be closed at the time, as determined by the brake conditions established, contact 106 of the valve $D^E$ and wire 102 to the other terminal of generator G. In case the relay 94 is the one that was energized during the incoming impulse then the above traced output circuit is closed at the front contact 101 of the relay 94. The release period of each relay 93 or 94 is made substantially equal to one-half the time required for the cam A to rotate from a point where one raised position 13 engages the spring 14 to the next. It follows then that the sending period of the apparatus of Fig. 2 will prevail during the receiving period of the apparatus of Fig. 1 and vice versa. At the end of the release period of the relay 93 or 94, it will drop to again connect the coils 34 and 35 to the input circuit. Thus the sending and receiving periods of the caboose equipment are synchronized with the receiving and sending periods of the locomotive equipment, respectively.

With the auxiliary mechanism of Fig. 2 set at the lap position as the result of the receipt of control impulses modulated at the frequency of M1, the relay 93 is picked up each impulse to close the output circuit in the caboose at the end of the impulse inasmuch as both relay L1 and the valve $D^E$ are now energized to close the contacts 103 and 106, respectively. The picking up of the relay 93 also completes the circuit from the modulator M1 in the caboose to its associated generator G. This last circuit can be traced from one terminal of M1 through the contact 107 of a manually operated circuit controller K1, wire 110, front contact 113 of the relay 93, wire 109, generator G and wire 108 to the opposite terminal of modulator M1. It follows then that the output circuit will be closed as long as relay 93 remains up and the impulses sent out will be modulated with the frequency of M1. In case the auxiliary mechanism is in the service condition as the result of control impulses modulated by the modulator M2 on the locomotive the output circuit in the caboose is closed at the end of each incoming impulse by the energizing of the relay 94 inasmuch as the valves $D^S$ and $D^E$ are energized to close the contacts 105 and 106, respectively. With relay 94 energized, the circuit for the modulator M2 in the caboose is closed at its front contact 117. The circuit extends from one terminal of M2 through the contact 111 of K1, wire 112, front contact 117 and then as above traced for modulator M1. Thus we see that under the service condition, the outgoing impulses from the caboose are modulated with the frequency of M2 and the sending circuit is closed during the interval that relay 94 remains energized. It is apparent from the foregoing description that when the auxiliary mechanism is set at the running condition due to the receipt of control impulses alternately modulated by M1 and M2 in cyclic order, the relays 93 and 94 are energized alternately, and the return impulses sent out by the apparatus of Fig. 2 are modulated with the frequencies of M1 and M2 in a cyclic order. In other words, under running condition of the brake valve EV on the locomotive, each time the locomotive equipment sends out an impulse modulated by the modulator 2 on the locomotive, the caboose equipment returns an impulse modulated by the modulator M2 in the caboose. Likewise each impulse from the locomotive modulated by modulator M1 on the locomotive is followed by an indication impulse modulated by the modulator M1 in the caboose. While it has here been considered that the frequencies of modulators M1 and M2 in the caboose are respectively the same as the frequencies of modulators M1 and M2 on the locomotive, these modulating frequencies need not necessarily be similar. It is necessary only that each selecting circuit be tuned to resonance at the frequency of the modulator with which it is associated.

On the locomotive there is provided two slow-releasing relays 118 and 119. When the caboose apparatus is returning impulses modulated by M1, to indicate that the auxiliary mechanism is in the lap condition, and the relay 83 on the locomotive is operated thereby, the relay 119 is energized by current flowing from the positive terminal of the battery 90 along wire 192, winding of relay 119, wire 121, front contact 122 of the relay 9 inasmuch as handle 3 is at the lap position and relay 9 energized, wire 123, front contact 89 of the primary relay 83, and to the negative terminal of battery 90. When the handle 3 is at the service position and relay 10 is energized, the caboose apparatus will return impulses modulated by M2 inasmuch as the auxiliary mechanism is now in the service condition, and thus the relay 85 on the locomotive is operated. The relay 119 is now energized by a circuit the same as above traced up to wire 121, thence through front contact 124 of the relay 10, wire 125, front contact 92 of relay 85 and to the negative terminal of battery 90. Again with handle 3 at the running position and relay 8 energized, the return impulses from the caboose are alternately modulated by M2 and M1. Let us consider first that the cam B is in the position shown in Fig. 1 where its spring 14 engages the front contact 15 so that the outgoing impulse from the locomotive is modulated by M2. The caboose apparatus returns an impulse modulated by M2 operating the relay 85. When cam B is in the position to close its contact 15, it also permits its spring 17 to engage the contact 18 and thus we find that the relay 119 is energized by the same circuit above traced up to the wire 121, thence through the front contact 126 of relay 8, wire 127, contact 128 of the key K, wire 129, spring 17 of cam B, contact 18, wire 125 and front contact 92 of relay 85 to the negative terminal of battery 90. As the cams A and B rotate, the next impulse sent out from the locomotive is modulated by M1 and the caboose apparatus returns an impulse modulated by M1 operating the relay 83. The cam B has now rotated to a position where its spring 17 engages the contact 19, and the relay 119 is again energized by the same circuit above traced up to the spring 17, thence by contact 19, wire 123 and front contact 89 of relay 83 to the negative terminal of battery 90. We see, therefore, that, under any operating condition, the relay 119 is retained energized if the return impulses are modulated with the proper modulating frequency.

It has already been pointed out how the relay 88 is energized whenever either primary relay 83 or 85 is operated and that the polarized armature 91 of relay 87 occupies the left-hand position when the return impulses are modulated by M1 to correspond to the lap condition of the auxiliary mechanism and occupies its right-hand position when the return impulses are modulated by modulator M2 corresponding to the service condition. Also, that the armature 91 oscillates between its two positions when the return impulses are alternately modulated with the two frequencies M1 and M2 in cyclic order under the running condition of the auxiliary mechanism. With relays 88 and 119 both energized and the armature 91 in the left-hand position, current is supplied to the indicating device L from the battery 90 along the wire 192, winding of a relay 162, front contact 130 of relay 119, back contact 131 of relay 118, as this relay will not at this time be energized, indicating device L, front contact 132 of relay 88, left-hand contact of polarized armature 91, and to the negative terminal of battery 90. When the armature 91 occupies the right-hand position then the current is supplied from battery 90 through the winding of the relay 162, front contact 133 of relay 119, back contact 134 of relay 118, indicating device S, front contact 135 of relay 88, and right-hand contact of polarized armature 91 to the negative terminal of battery 90. It follows that the indicating device S is selected when the caboose apparatus returns impulses modulated with the frequency corresponding to the service position of the brake valve.

When the polarized armature 91 oscillates between its two positions as the result of return impulses alternately modulated by M1 and M2 in cyclic order, the two halves of primary winding 136 of a transformer V are alternately energized. With the primary 136 thus energized, alternating current is supplied by the secondary 137 to the relay 118 through a rectifier 138 to energize that relay. With relay 118 energized at a time when the relays 88 and 119 are also energized then current is supplied from the battery 90 through the winding of the relay 162, front contact 139 of relay 119, front contact 140 of relay 118, indicating device R, and front contact 141 of relay 88 to the negative terminal of battery 90. The indicating device R is therefore selected whenever the auxiliary mechanism in the caboose occupies the running position.

In systems for controlling the brakes of a train at a point outside of the locomotive, the train may be pulled in two thereby rupturing the air hose without the control equipment at either end of the train going to the emergency condition. In case such a rupture takes place near the caboose of a long freight train, it may be some time before the emergency application reaches the locomotive by the ordinary operation of the brakes. The valve mechanism I and its associated devices are provided to insure that as soon as an emergency reduction of the brake pipe pressure takes place at the caboose for any cause whatsoever, the caboose control equipment will assume its emergency position and thus stop the sending of return impulses, so that immediately there is established electrically an emergency application at the locomotive. The mechanism I connected to the brake pipe BP by a pipe 142 controls by means of a piston 143 the valve 144 and the circuit controller 67. With normal pressure in the brake pipe, the spring 145 is compressed so that the piston 143 takes the position shown in Fig. 2. Under this condition, controller 67 is closed to complete the connection from the magnets 64 of the brake valves to the negative battery. Also in this position of the piston 143 the valve 144 is open so that air can flow through a check 146 to the chamber 147, building up a pressure at the bottom of the piston 148 which is thereby moved against the force of the spring 149 to the position shown in the figure. This position of the piston 148 causes a circuit controller 150 to be opened. In case of a loss of brake pipe pressure equal to that brought about by a rupture of an air hose, the piston 143 is forced downward by the action of the spring 145 until it reaches the stops 151. This movement of the piston 143 causes the controller 67 to be opened to deenergize all the brake valves. Since the output circuit in the caboose is controlled by the contacts of the brake valves the deenergizing of them results in the return impulses being immediately stopped. The failure to receive indication impulses at the locomotive results in that neither one of the primary relays is operated and the relay 88 is deenergized. As the relay 88 drops, it ruptures at its front contact 153, the circuit to the magnet 152. The deenergizing of the magnet 152 causes the auxiliary brake valve 28 to connect the brake pipe BP at the locomotive to the atmosphere through a vent of such characteristics as to cause an emergency application of the brakes at the locomotive. The downward movement of the piston 143 also causes the valve 144 to be pressed against its seat by the spring 154. The spring 154 should exert no more force than is necessary to seat the valve firmly so that pressure from the brake pipe can not flow to the chamber 147 when that in the brake pipe is higher than that in chamber 147. Air will now flow from the chamber 147 through the check 146 and past valve 144 to the brake pipe. After a suitable reduction of pressure in chamber 147, the spring 149 forces the piston 148 down against the stops 155 closing the associated circuit controller 150 so that the connection from the magnets of the brake valves is again closed to the negative terminal of the battery 47.

The deenergizing of the magnet 152 of the valve 28 on the locomotive opens a contact 25 in the output circuit of the generator G. To restore the valve 28, the engineman must move his handle 3 to the emergency position where the contactor 2 engages the contacts 4 and 161 closing thereby a circuit from battery 11 to a slow-releasing relay 163. As relay 163 becomes energized to close its front contact 164, current is supplied from the positive terminal of battery 90 through the magnet 152 of the valve 28 and the contact 164 to negative terminal of battery 90 restoring the valve 28 and closing the contact 25 in the output circuit. The engineman can now move his handle to any of the other operating positions and set up that condition of the auxiliary brake mechanism in the usual manner. As soon as the brake pipe pressure at the caboose reaches the point where it overcomes the force of spring 145, the valve 144 is opened and the contact 67 closed. The closing of contact 67 restores the normal connection for the magnets 64 of the brake valves, and the opening of the valve 144 permits air pressure to again flow to the chamber 147 to restore the piston 148. The check 146 and the volume of the chamber 147 are so chosen as to insure that the contact 150 will not be opened before contact 67 is closed. It is evident that a mechanism I can also be installed on the locomotive and arranged to bring about electrically an emergency application at the caboose in case of a break in two occurring near the locomotive of a long freight train.

As stated earlier in the specification, messages may be exchanged between the two locations of the apparatus of Figs. 1 and 2. On the locomotive, the key K is provided while in the caboose there is mounted a circuit controller K1. In the event the crew on the locomotive desires to send a message to the crew in the caboose, the key K is depressed bringing the controllers 24, 36 and 128 to the positions shown by the dotted lines. The effect of this is merely to transfer the functions described above for the cams A and B to the cams C and D, respectively, so that a lower periodic rate of the control impulses results. The contact 24 now connects the output circuit to the spring 14 of the cam C in place of that of the cam A. The contact 36 connects the supply of the modulators under the running condition to the spring 14 of cam D in place of that of cam B, and the contact 128 transfers the control of the relay 119 from the spring 17 of cam B to the spring 17 of the cam D. As the relative positions of the raised portions of the cam D to the raised portions 13 of the cam C are the same as those described as existing between cam B and cam A, the operation of shifting from the sending to the receiving condition and for alternately modulating the carrier current, under the running condition, is the same as described above except that the rate of occurrence of the impulses is materially lower due to the fact that cam C has only four raised portions whereas cam A had six and cam D has only two while cam cam B had three.

With the control impulses of the rate produced by the cam C received at the caboose, the relay 62 is no longer energized due to the fact that the secondary circuit of 58 which supplies current to relay 62 is tuned to respond to the rate of impulses produced by the cam A. With relay 62 deenergized, current is supplied to the signaling device 156 by a circuit that includes the back contact 157 of relay 62 and the front contact 114 of relay 63. As long then as the key K is depressed, the signaling device 156 is energized, while at the same time the control of the auxiliary brake mechanism in the caboose remains unmolested.

It will be recalled that when the control impulse sent out by the locomotive is modulated by M2, the return impulse is likewise modulated by M2; that when the control impulse is modulated by M1 then the return impulse is also modulated by M1. If it is desired to send a message from the caboose to the locomotive, the circuit controller K1, which is a double pole double throw switch, is shifted to the position shown by the dotted lines in Fig. 2, causing thereby a reversal of the modulation so that an impulse from the locomotive modulated by M1 is followed by a return impulse modulated by M2, and an impulse modulated by M2 of the apparatus of Fig. 1 is followed by a return impulse modulated by M1. Looking at Fig. 1, the circuit to energize the relay 119 includes a front contact of one of the relays 8, 9 or 10 and a front contact of one of the primary relays 83 or 85. With relay 9 up then the circuit for 119 includes a front contact 122 of relay 9 and the contact 89 of the relay 83. As the outgoing impulse is modulated by M1 when the relay 9 is up, the return impulse must be modulated by M1 to operate relay 83 in order that the relay 119 may be energized. Again, if the relay 10 is selected, the circuit for relay 119 includes the front contact 124 and the contact 92 of relay 85. As the outgoing impulse on the locomotive is modulated by M2 when relay 10 is selected, it follows that the return impulse must be modulated by M2 to operate relay 85 in order that relay 119 may be energized. If relay 8 is the one selected, the circuit for relay 119 includes the front contact 126, the normal position of the circuit controller 128 of key K, wire 129, spring 17 of cam B, front contact 18, wire 125, and the front contact 92 of relay 85, or the circuit extends from the back contact 19 along the wire 123 and front contact 89 of relay 83. With the cams in the position as shown, the outgoing impulse is modulated by M2 and the next return impulse must be modulated by M2 to operate 85, as 18 of cam B is still closed during this return impulse, in order to energize the relay 119. The next outgoing impulse is modulated by M1 and the return impulse must be modulated by M1 to operate 83 as the cam B has now moved to a point where the contact 19 is closed, in order to energize the relay 119. It is apparent from the foregoing discussion that a reversal of the modulation of the return impulses accomplished by the shifting of the circuit controller K1 results in the relay 119 becoming deenergized under all operating conditions. As the relay 88 will be energized even though there is a reversal in the modulation of the return impulses, current is supplied from the battery 90 to the winding of the relay 162, back contact 158 of relay 119, signaling device 159, and front contact 160 of the relay 88 to the negative terminal of the battery 90. The result brought about therefore by the crew in the caboose shifting the position of the circuit controller K1 is that the normal indication on the locomotive is extinguished and the signaling device 159 rendered active.

The relay 162 is normally energized when the circuit to any one of the indicating devices is closed or when the circuit to the signaling device 159 is closed. Through the front contact 165 of relay 162, the circuit to the magnet 152 of the valve 28 is controlled. If, for any reason, there is a local failure of any of the indicating circuits, the relay 162 becomes deenergized to trip off the valve 28 and thereby set up an emergency application at the locomotive and stop the sending of the control impulses to the caboose. The failure to receive control impulses results in the auxiliary mechanism in the caboose immediately establishing the emergency condition of the brakes.

In Fig. 3 there is disclosed a second form of apparatus that may be used at the control point of a control system for a railway train. The handle 3 of the usual engineer's brake valve EV is used to actuate a contactor 2 to select the different modulating frequencies for the outgoing impulses of carrier current in the same manner as in Fig. 1 except that they are now controlled directly without the use of relays 8, 9 and 10. In this form of the apparatus there is provided a contactor 195 also operated by handle 3 adapted to engage contacts 196 and 197 in the emergency position only to control the relay 163. The locomotive is equipped with a generator G, modulators M1 and M2 as well as a filter F and an amplifier AM similar to those shown in Fig. 1. Also the locomotive is provided with inductor coils 20 and 21 mounted in inductive relation to the traffic rails 1 and 1ª as described for Fig. 1. In this form of my invention, mechanically tuned oscillators are provided to take place of the motor driven cams of Fig. 1. A preferred form of these mechanically tuned oscillators designated by the reference characters N1 and N2 is fully disclosed and described in the Paul N. Bossart application for Letters Patent, Serial No. 398,342, filed Oct. 9, 1929, and it will suffice for this description to say that they each consist of a field structure E between the poles P1 and P2 of which there is mounted an armature H pivoted at O. Referring to oscillator N1, its armature H is biased to a given position between the poles P1 and P2 in which position the contacts 167 and 168 actuated by the armature H occupy the position shown in Fig. 3 when the oscillator is inactive. The field winding 120 of N1 is connected to the battery 169 all the time that the equipment is in service. The energizing of the field winding 120 causes the armature H to rotate in the direction indicated by the arrow. After a slight movement of armature H, the contact 167 is ruptured. Armature H will rotate a little farther and then due to its biasing, it will reverse its movement until the contact 167 is again closed to reenergize the field winding 120. The inertia of armature H in its return movement will carry it past the normal position far enough that contact 168 will engage its right-hand contact. The biasing and the weight of the armature H is made such that it will have a natural period of say 120 cycles per minute and thus it will oscillate at this frequency as long as current is supplied to the field winding 120. The oscillator N2 is similar except that its biasing and the weight of its armature H is made such that it has a natural period of say 80 cycles per minute at which frequency it will oscillate as long as its field winding 80 is energized.

The oscillators N1 and N2 control at their lower contacts 168 and 170, respectively, the sending of the normal control impulses. The oscillator N1 is effective under normal conditions while the oscillator N2 is effective under signaling conditions. With the left-hand contact of 168 closed, current is supplied from the positive terminal of the battery 169 through the winding of a relay 171, wire 172, left-hand contact of 168, and the normal position of the key K2 back to the negative terminal of battery 169. It follows that with contact 168 in this position, the relay 171 is energized and when the contact 168 swings to its right-hand position, relay 171 is deenergized. With the relay 171 picked up to close the front contact of its armature 173, the output circuit of the generator G is closed, while, when the relay 171 is deenergized, the filter F is connected to the inductor coils 20 and 21 at the back contact of the armature 173. Thus the time is divided into sending and receiving periods, by the contact 168 of the oscillator N1 through its control over the relay 171. In the event the key K2 is depressed to its dotted line position, the control of relay 171 is transferred to the contact 170 of the oscillator N2. The dividing of time between the sending and receiving periods will still prevail, the difference being that the rate of changing from the sending to the receiving condition instead of being 120 times per minute will now be at the rate of 80 times per minute.

The proper modulation of carrier current impulses is accomplished by means of the contacts controlled by the handle 3 of the valve EV. With handle 3 at the lap position so that contactor 2 engages contacts 4 and 6, the modulation is that of modulator M1. If handle 3 is in the service position then the modulator M2 is active, while with the handle at release or running position, M1 or M2 are alternately connected in cyclic order to the generator G through contacts on the relays 174 and 175 in the following manner: Suppose first that relays 174 and 175 are both deenergized and that contact 168 is closed towards the left. As the left-hand contact of 168 is closed, the relay 174 receives current from battery 169 through a circuit extending from positive battery 169, wire 176, back contact 177 of relay 175, the top winding of relay 174, left-hand contact of 168, and key K2 to the negative terminal of 169. When contact 168 changes positions to make towards the right, the relay 174 does not drop because it is slightly slow-releasing. A circuit can now be traced from battery 169 along wire 176, front contact 178, lower winding of 174, right-hand contact of 168, and then back to the negative terminal of battery 169. Another circuit also exists from the front contact 178 through the lower winding of the relay 175, right-hand contact of 168 and to negative battery with the result that the relay 175 is now picked up. When contact 168 next swings to the left, the relay 175 does not at once drop due to the fact that it also is made slightly slow-releasing and thus the circuit to the top winding of relay 174 is open at the back contact 177 of relay 175. The release period of relay 174 is such that before 168 again swings back towards the right, so as to close the circuit to its lower winding, the relay 174 drops. While 168 is towards the left, a circuit is closed from positive battery along wire 176, front contact 179, top winding of relay 175, left-hand contact of 168 and back to the negative terminal of battery 169. When 168 next swings towards the right, the first named circuit for relay 175 is open as relay 174 is now down and before 168 can again swing to the left, the relay 175 drops. Hence both relays 174 and 175 are now down and ready to start the cycle all over again as contact 168 next swings to the left. It will be seen from the above that during every other sending period, (relay 171 up) the relay 174 is up and during every other such periods, the relay 175 is also up. During the first sending period when relay 174 only is energized, the modulator M1 is connected to the generator G by a circuit along wire 180, front contact 181 of relay 174, back contact 182 of the relay 175, wire 183, contacts 5, 2 and 4, wire 184, generator G, and wire 185 to the opposite terminal of modulator M1. During the second sending period when relay 175 is up then the modulator M1 is disconnected and a circuit completed for the modulator M2 that extends along the wire 186, front contact 182 of the relay 175, and then as before traced for the modulator M1. Thus, under running condition of the brake valve EV, the impulses of carrier current will be alternately modulated by M1 and M2 in cyclic order.

When messages are sent from the locomotive by depressing the key K2, the element 170 of the oscillator N2 is made active to operate the relays 174 and 175 in a similar manner as described above for the element 168 of the oscillator N1. The operation of the apparatus, however, is slower making the length of the impulses transmitted of a somewhat longer duration.

In Fig. 3, the apparatus for receiving the return indication is made such that a single indication device is used for all positions of the auxiliary mechanism. The primary relays 83 and 85 of Fig. 3, respectively, respond to modulated frequencies of M1 and M2 in the same manner as was described in connection with Fig. 1. The polarized relay 87 of Fig. 3 operates in the same manner as described for the corresponding relay of Fig. 1. A single winding slow-releasing relay 187 is energized in series with either of the windings of the polarized relay 87 and this relay 187 energizes, in turn, the indicating device 188 through its front contact 189. In this form of return indication apparatus on the locomotive, the equipment of Fig. 2 would be modified in the manner as disclosed in Fig. 4 in which the two relays 93 and 94 of Fig. 2 are combined into one double winding relay designated in Fig. 4 by the reference character 194. This relay 194 will be picked up when either of its windings is energized as the result of the operation of either one of the primary relays 39 or 40. Under normal conditions of the apparatus of Fig. 2, when it is modified as shown in Fig. 4, the return impulses are modulated by M1 for all brake conditions regardless of what modulation may be applied to the control impulses. The receiving of an indication impulse modulated by M1 by the apparatus of Fig. 3, operates the relay 83 causing thereby the polarized relay 87 to move its polarized armature 91 to the left-hand position and to energize the relay 187. As stated above, the energizing of the relay 187 causes the indication device 188 to be displayed.

When it is desired to transmit messages from the caboose, the key K1 of Fig. 4 is depressed so that the return impulses are then modulated by M2 which, in turn, causes the operation of relay 85 of Fig. 3. The operation of relay 85 so energizes the polarized relay 87 that its polarized armature 91 is held in the right-hand position while the relay 187 is still retained energized. The result is that not only is the return indication device 188 retained active but the signaling device 190 is also energized by a circuit that is closed at the right-hand contact of armature 91.

The operation of a system composed of the apparatus of Figs. 3 and 2, when modified by that shown in Fig. 4, is similar to that already described in detail for Figs. 1 and 2, and it is thought that it need not be but briefly reviewed. Normally both mechanically tuned oscillators N1 and N2 are active so that with the key K2 in its normal position, the relay 171 is operated in step with the oscillations of N1 which has a frequency of 120 cycles per minute. The operation of relay 171 divides the time between the sending and receiving periods. With the handle 3 at the lap position, then the outgoing control impulses from the locomotive are modulated by M1, and when these impulses are picked up at the caboose, they operate the relay 39 and thereby establish the lap condition of the auxiliary brake mechanism. The return impulses are modulated by M1 as front contact 193 of relay 194 is closed and when these return impulses are received by the apparatus of Fig. 3, the primary relay 83 is operated resulting in the indicating device 188 being energized. If the handle 3 is placed at the service position then the outgoing impulses are modulated by M2 and when these impulses are received at the caboose, the primary relay 40 is operated resulting thereby in a service condition of the auxiliary brake mechanism. The return impulses are again modulated by M1 so that the indicating device 188 is again energized. In the case the handle 3 is placed at release or running position, the control impulses supplied by generator G are alternately modulated by M1 and M2 in cyclic order due to the operation of the relays 174 and 175. When these impulses are picked up at the caboose there is established the running condition of the auxiliary mechanism. Under the running condition of the apparatus of Fig. 2, when modified as shown in Fig. 4, the return impulses are modulated by M1 so that the indicating device 188 is again energized.

The sending of messages from the locomotive is accomplished by depressing the key K2 of Fig. 3 establishing thereby a slower rate of sending as determined by the oscillator N2. This slow rate of control impulses causes the relay 62 of Fig. 2 to become deenergized due to the fact that the secondary circuit of 58 is tuned to the higher rate.

With the relay 62 deenergized, the signaling device 156 is rendered active the same as described in connection with Figs. 1 and 2. The sending of a message from the caboose to a locomotive equipped with the apparatus of Fig. 3 is accomplished by depressing the key K1 of Fig. 4 to bring about a change in the modulation of the return impulses from M1 to that of M2. The receiving of return impulses modulated by M2 operates the primary relay 85 of Fig. 3 so that the polarized armature 91 is shifted to the right-hand position to close the circuit to the signaling device 190, while at the same time the circuit to the indicating device remains intact. The operation of the mechanism I and its associated devices will be the same for a system using the apparatus of Fig. 3, as was described in connection with Fig. 1.

A control system such as here disclosed provides for a maximum number of operating functions with a minimum number of modulation frequencies for the carrier current permitting thereby a large number of non-interfering control systems for a given number of frequency channels. In systems of this character, it has been found that false shock excitation will occur at intervals. In my invention, this type of false excitation will very likely pick up both primary relays at the same time which thereby energizes both windings of the polarized relay at the same time causing the polarized armature to remain stationary so that nothing more serious will occur than the loss of one impulse. The commercial form of the apparatus of such systems is so designed that the loss of one impulse can be tolerated, and thus such electrical influences will cause no false operation. Such a system as here described, while highly selective, permits simultaneous operation of more than one function without interference.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. A control system including, a source of periodic impulses of current, means to modulate a plurality of successive impulses each with a distinctive characteristic in cyclic order, and a control means effectively influenced by the cyclic order of said successive impulses.

2. A control system including, a source of periodic impulses of current, a plurality of modulators each having a distinctive characteristic, means to modulate successive impulses of said current each by a different modulator in cyclic order, and a control means rendered active by the cyclic order of said successive impulses.

3. A control system including, a source of periodic impulses of carrier current, two modulators having distinctive characteristics, means to modulate said carrier current impulses alternately by said modulators in cyclic order, electroresponsive means selectively operated in response to the modulating characteristics of said impulses, and a signaling means maintained in an active condition by the operating of said electroresponsive means in cyclic order.

4. A control system including, a transmitting circuit, a current source adapted to supply said transmitting circuit with periodic impulses of current, a modulating means adapted to supply a plurality of modulating currents of different characteristics, a selecting means to modulate alternate impulses of the current supplied to the transmitting circuit each with a predetermined modulating current, a receiving circuit influenced by said transmitting circuit, two electroresponsive devices controlled by the receiving circuit alternately operated in response to the different modulation of alternate current impulses, and a control device rendered active by the alternate operation of said electroresponsive devices.

5. A control system including, a source of current, a transmitting circuit, means to periodically connect said source to the transmitting circuit to supply current impulses to the transmitting circuit, means to differently modulate alternate impulses of said current, a receiving circuit influenced by said transmitting circuit, two electroresponsive devices controlled by the receiving circuit alternately operated in response to the different modulation of alternate impulses, and a control means rendered active by the alternate operation of said electroresponsive devices.

6. A control system including, a source of carrier current, means to successively modulate said carrier current by a plurality of different modulators with each of said modulators prevailing for a predetermined period and occurring in cyclic order, and a mechanism effectively influenced by the successive modulations of the carrier current maintained active by the cyclic order of said modulations.

7. A control system including, a source of carrier current, means to alternately modulate said carrier current with two different frequency currents with each of said currents prevailing for a predetermined period, and a mechanism effectively influenced by the different modulating currents maintained in an active condition by the alternate modulating of the carrier current.

8. A control system for railway trains including, a source of carrier current, means to alternately modulate said carrier current with two currents having different frequencies, a receiving device on the train influenced by said carrier current, two electroresponsive devices carried on the train controlled by said receiving device selectively responsive to said modulating currents, and a control mechanism jointly controlled by said electroresponsive devices.

9. A control system for railway trains including, a source of carrier current, manually controlled means located at one point on a train to alternately modulate said carrier current with two currents having different frequencies, a receiving device located at a second point on the train influenced by said carrier current, two electroresponsive devices controlled by said receiving device selectively responsive to said modulating frequencies of said carrier current, and a brake controlling mechanism adapted to produce a predetermined condition of the brake pipe pressure jointly controlled by said electroresponsive devices.

10. A control system including, means to supply alternating currents of a plurality of different single frequencies, a carrier current to convey said frequencies to a remote point, means to impress on said carrier current the different frequencies successively in cyclic order, a plurality of electroresponsive devices located at the remote point selectively responsive to the different frequencies and thereby operated in cyclic order, and a mechanism controlled by the electroresponsive devices maintained active as long as they are operated in cyclic order.

11. A control system including, a source of carrier current, two modulators; a control means having a plurality of positions adapted to modulate said carrier current with one modulator in one position, to modulate the carrier current with the other modulator in a second position and to modulate the carrier current alternately with said modulators in a third position; two relays controlled by said carrier current selectively responsive to the modulations of said carrier current, and an operating mechanism having a plurality of conditions controlled by said relays arranged to assume one condition when the relay corresponding to one modulation is selected, to assume a second condition when the relay corresponding to the second modulation is selected, and to assume a third condition when the relays are alternately selected.

12. A control system for railway trains including, a source of carrier current, two modulators; a control means having a plurality of positions adapted to modulate said carrier current with one modulator in one position, to modulate the carrier current with the other modulator in a second position and to modulate the carrier current alternately with said modulators in a third position, and to modulate the carrier current with neither modulator in a fourth position; two relays located on a train controlled by said carrier current selectively responsive to the modulations of the carrier current; and a brake controlling mechanism adapted to establish the running, lap, service and emergency conditions of the brake pipe pressure controlled by said relays arranged to establish the lap condition when the relay corresponding to one modulation is selected, to establish the service condition when the relay corresponding to the other modulation is selected, to establish the running condition when the relays are alternately selected and to establish the emergency condition when neither relay is selected.

13. A brake control system for railway trains including, electroresponsive means at each end of a train each adapted to automatically create a predetermined condition of the brake pipe pressure, and a circuit controller controlled by the pressure of the brake pipe to electrically control under certain conditions both of said electroresponsive means.

14. A brake control system for railway trains including, electroresponsive means at each end of a train each adapted to automatically create an emergency condition of the brake pipe pressure, and an electric circuit rendered effective in case of a rupture of the brake pipe for causing said electroresponsive means to each immediately create an emergency condition of the brake pipe pressure.

15. A brake control system for railway trains including, an electroresponsive means at one end of the train adapted to automatically create an emergency condition of the brake pipe pressure, and an electric circuit means rendered effective in response to the emergency condition of the brake pipe pressure at the end of the train opposite the electroresponsive means for causing said electroresponsive means to create the emergency condition at its end of the train.

16. A brake control system for railway trains including, means controlled by the brake pipe pressure at one end of a train rendered effective in response to a given condition of the brake pipe pressure at its end of the train to electrically establish automatically a like condition of the brake pipe pressure at the opposite end of the train and thereby create a like brake control at each end of the train substantially simultaneously.

17. In combination, two code following relays, a polarized armature; means to retain said polarized armature in one position in response to the operating of one of said relays, to retain it in a second position in response to the operating of the other relay and to cause it to oscillate between the two positions in response to an alternate operation of said relays; a first control device rendered active when said polarized relay is retained in the first mentioned position, a second control device rendered active when the armature is retained in the second mentioned position, and a third control device rendered active when said armature oscillates between its two positions.

18. A brake control system for railway trains in combination with the usual engineer's brake valve on the locomotive, an auxiliary brake controlling mechanism at another point on the train adapted to reproduce the running, lap, service and emergency conditions of the engineer's brake valve, a source of carrier current, two modulators having different characteristics; means to modulate the carrier current with one modulator under lap condition of the engineer's valve, to modulate the carrier current with the other modulator under the service condition of the engineer's valve, to modulate the carrier current alternately with said modulators under running condition of the engineer's valve and to modulate it with neither modulator under emergency conditions of the engineer's valve; and a receiving means at said other point on the train responsive to said carrier current modulated by the first mentioned modulator for causing the lap condition of the auxiliary brake mechanism, responsive to the carrier current modulated by the second mentioned modulator for causing the service condition of the auxiliary mechanism, responsive to the carrier current modulated alternately by said modulators for causing the running condition of the auxiliary mechanism and for causing said mechanism to assume the emergency condition when the carrier current is not modulated with either modulator.

19. A control system including, a source of carrier current, means to modulate said carrier current by an alternating current of a given frequency, means to supply to a transmitting circuit periodic impulses of said modulated carrier current at a predetermined rate, a receiving means influenced by the carrier current supplied to the transmitting circuit, a first electrically tuned circuit controlled by the receiving means responsive only to the given frequency of the modulating current, a relay controlled by the said circuit operated in step with the periodic impulses of the modulated carrier current, a second electrically tuned circuit controlled by said relay responsive only when said relay is operated at the above-mentioned predetermined rate, and a control relay energized by said second electrically tuned circuit.

20. A control system including, a control station, a remote station, an operating mechanism at each station, means at each station to supply periodic impulses of carrier current, means to modulate said carrier current at each station with a predetermined frequency, a transmitting and receiving means at each station arranged to exchange impulses of the modulated carrier current between said stations to control said operating mechanisms, a signaling device at each station, a manually controlled means at the control station adapted to change the rate of occurrence of the carrier current impulses supplied at said station, a manually controlled means at the remote station adapted to change the modulating frequency of the carrier current supplied at that station, means at the remote station responsive to the change in the periodic frequency of the impulses supplied at the control station to render its signaling device active, and means at the control station responsive to the change in the modulating of the carrier current impulses supplied at the remote station to render its signaling device active.

21. A control system including a control station, a remote station, a transmitting and receiving means at each station arranged to exchange periodic impulses of current between the two stations with successive impulses modulated in a predetermined sequence, a controlling means at each station rendered active by the exchange of said modulated impulses, a manually controlled means at the remote station adapted to reverse the sequence of the modulation at that station, and a signaling device at the control station responsive to the said reversal of the modulating sequence.

22. A control system including, a control station, a remote station, a transmitting and receiving means at each station arranged to exchange periodic impulses of current between the two stations with the successive impulses sent out by each station alternately modulated by one of two different modulators in a given sequence, a controlling means at each station rendered active by the exchange of said modulated impulses, a manually controlled means at the remote station adapted to reverse the sequence of the modulation at that station, and a signaling device at the control station responsive to the reversal of the modulating sequence.

23. A control system including, a control means having different operating conditions, a source of periodic impulses of current, means rendered active for a given condition of the control means to modulate a group of successive current impulses each with a distinctive characteristic and to continually repeat the group as long as said given condition remains in effect, and a receiving means responsive to the group of impulses retained active by the repeating of said group.

24. A control system including, a control means having different operating conditions, a source of periodic impulses of current, means rendered active for a given condition of the control means to modulate a group of successive current impulses each with a different low frequency current and to continually repeat the modulation in the same order as long as said given condition remains in effect, and a receiving means responsive to the group of impulses retained active by the repeating of said group.

In testimony whereof I affix my signature.

ANDREW J. SORENSEN.